(12) United States Patent
Zou

(10) Patent No.: US 12,092,384 B2
(45) Date of Patent: Sep. 17, 2024

(54) AIR CONDITIONER CONTROL METHOD AND DEVICE AND AIR CONDITIONER

(71) Applicants: GD MIDEA AIR-CONDITIONING EQUIPMENT CO., LTD., Guangdong (CN); MIDEA GROUP CO., LTD., GUANGDONG (CN)

(72) Inventor: Dashu Zou, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 203 days.

(21) Appl. No.: 17/482,927

(22) Filed: Sep. 23, 2021

(65) Prior Publication Data
US 2022/0010979 A1   Jan. 13, 2022

Related U.S. Application Data

(63) Continuation of application No. PCT/CN2019/098237, filed on Jul. 29, 2019.

(30) Foreign Application Priority Data

Mar. 25, 2019 (CN) .......................... 201910227622.0
Mar. 29, 2019 (CN) .......................... 201910248831.3

(51) Int. Cl.
*F24F 11/84* (2018.01)
*F24F 1/0003* (2019.01)
(Continued)

(52) U.S. Cl.
CPC ............ *F25B 49/02* (2013.01); *F24F 1/0003* (2013.01); *F24F 11/65* (2018.01); *F24F 11/84* (2018.01); *F24F 11/88* (2018.01)

(58) Field of Classification Search
CPC .. F24F 11/84; F24F 11/88; F24F 11/65; F24F 1/0003
See application file for complete search history.

(56) References Cited

U.S. PATENT DOCUMENTS

2004/0050093 A1    3/2004  Lifson et al.
2017/0023311 A1*   1/2017  Urbanski .................. F28F 3/10

FOREIGN PATENT DOCUMENTS

CN            101113834 A      1/2008
CN            101650064 A      2/2010
(Continued)

OTHER PUBLICATIONS

Office Action dated Dec. 16, 2022 received in Canadian Patent Application No. CA 3,134,876.
(Continued)

*Primary Examiner* — Nael N Babaa
(74) *Attorney, Agent, or Firm* — Scully, Scott, Murphy & Presser, P.C.

(57) ABSTRACT

A control method and device and an air conditioner are provided. The air conditioner has an outdoor condenser, an indoor evaporator, a first electronic expansion valve, a throttle valve, and a heat dissipation coolant pipe arranged in an electric control box. By utilizing the control method and device, the air conditioner uses the heat dissipation coolant pipe to dissipate heat from the electric control box of the air conditioner. The heat generated by the electric control box can thus be timely removed. The temperature of the elements of the air conditioner can be lowered and the reliability and service life of the air conditioner can be improved.

6 Claims, 8 Drawing Sheets

(51) Int. Cl.
    *F24F 11/65*     (2018.01)
    *F24F 11/88*     (2018.01)
    *F25B 49/02*     (2006.01)

(56) References Cited

FOREIGN PATENT DOCUMENTS

| | | |
|---|---|---|
| CN | 202792404 U | 3/2013 |
| CN | 103411292 A | 11/2013 |
| CN | 104534732 A | 4/2015 |
| CN | 106196336 A | 12/2016 |
| CN | 106500390 A | 3/2017 |
| CN | 108106041 A | 6/2018 |
| CN | 109373533 A | 2/2019 |
| CN | 109945389 A | 6/2019 |
| CN | 109945401 A | 6/2019 |
| JP | 2004106614 A | 4/2004 |
| JP | 2008002741 A | 1/2008 |
| JP | 2014102050 A | 6/2014 |
| KR | 20050120396 A | 12/2005 |
| WO | 2018016064 A1 | 1/2018 |

OTHER PUBLICATIONS

International Search Report dated Nov. 28, 2019 issued in PCT/CN2019/098237.
Chinese Office Action dated Dec. 4, 2019 issued in CN 201910227622.0.
Chinese Office Action dated Nov. 19, 2019 issued in CN 201910248831.3.

\* cited by examiner

AIR CONDITIONER CONTROL METHOD AND DEVICE AND AIR CONDITIONER

CROSS-REFERENCE TO RELATED APPLICATIONS

The present application is a continuation application of PCT International Application No. PCT/CN2019/098237, filed on Jul. 29, 2019, which claims priority to and the benefit of Chinese Patent Application No. 201910248831.3 filed on Mar. 29, 2019 and Chinese Patent Application No. 201910227622.0 filed on Mar. 25, 2019, the entire contents of which are incorporated herein by reference for all purposes. No new matter has been introduced.

FIELD

The present disclosure relates to the technical field of electrical appliances, and more particularly, to a control method for an air conditioner, a control device for an air conditioner, and an air conditioner.

BACKGROUND

For air conditioners in related technologies, air cooling is usually applied to dissipate heat generated by an electric control box of the air conditioners. However, the heat dissipation effect for the electric control box is poor at a high temperature, and the heat generated by the electric control box cannot be taken away timely to reduce the temperature of components of the air conditioners, thereby affecting the service life and reliability of the air conditioners. Meanwhile, a variable frequency air conditioner cannot reach high operating frequencies at high temperatures, and thus cannot take advantages of the variable frequency air conditioner to meet certain user requirements.

SUMMARY

The present disclosure at least solves one of technical problems existing in the related art.

A first aspect of embodiments of the present disclosure provides an air conditioner. According to the air conditioner, a heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements.

A second aspect of embodiments of the present disclosure provides a control method for an air conditioner.

A third aspect of embodiments of the present disclosure provides a control device for an air conditioner.

A fourth aspect of embodiments of the present disclosure provides another control method for an air conditioner.

A fifth aspect of embodiments of the present disclosure provides another control device for an air conditioner.

A sixth aspect of embodiments of the present disclosure provides another air conditioner.

A seventh aspect of embodiments of the present disclosure provides an electronic device.

An eighth aspect of embodiments of the present disclosure provides a computer readable storage medium.

To achieve the above aspects, the first aspect of embodiments of the present disclosure provides an air conditioner, comprising: an outdoor condenser, an indoor evaporator, a first electronic expansion valve, a throttle valve, and a heat dissipation coolant pipe arranged in an electric control box, wherein
  the outdoor condenser is communicated with a first end of the heat dissipation coolant pipe via the first electronic expansion valve,
  the indoor evaporator is communicated with a second end of the heat dissipation coolant pipe via the throttle valve,
  the first electronic expansion valve is configured to throttle a coolant in a heating mode, and
  the throttle valve is configured to throttle the coolant in a cooling mode.

According to the air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via the throttle valve, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements.

According to an embodiment of the present disclosure, the air conditioner further comprises: a compressor, a second electronic expansion valve and a plate heat exchanger, wherein
  the indoor evaporator is communicated with the throttle valve via a first coolant branch of the plate heat exchanger,
  the compressor is communicated with the throttle valve via a second coolant branch of the plate heat exchanger and the second electronic expansion valve in sequence, and
  the second electronic expansion valve is configured to throttle the coolant in a heating mode.

According to an embodiment of the present disclosure, the air conditioner further comprises: a controller, wherein the controller is configured to:
  acquire an outdoor ambient temperature when the air conditioner is turned on in the cooling mode,
  acquire a preset current threshold, a preset compressor frequency threshold and a preset current difference threshold corresponding to the outdoor ambient temperature,
  acquire, at the time that the compressor is started for a first set time, a working current as a first current,
  acquire, at the time that the compressor is started for a second set time, a working current as a second current, and acquire, at the time that the compressor is started for the second set time, a compressor frequency,
  detect and confirm that the following three conditions are met at the same time, and control the air conditioner to stop and exchange control strategies for the first electronic expansion valve and the second electronic expansion valve, wherein the three conditions are:

the second current being greater than the preset current threshold, a difference between the second current and the first current being greater than the preset current difference threshold, and the compressor frequency at the time that the compressor is started for the second set time being less than the preset compressor frequency threshold.

According to an embodiment of the present disclosure, the air conditioner further comprises: a four-way valve and a liquid storage tank, wherein a first valve port of the four-way valve is communicated with the outdoor condenser, a second valve port of the four-way valve is communicated with the indoor evaporator, a third valve port of the four-way valve is communicated with the liquid storage tank, a fourth valve port of the four-way valve is communicated with the compressor, and the liquid storage tank is communicated with the compressor.

According to an embodiment of the present disclosure, the air conditioner further comprises a separator, wherein the liquid storage tank and the compressor are respectively communicated with the fourth valve port of the four-way valve via the separator.

To achieve the above aspects, the second aspect of embodiments of the present disclosure provides a control method for an air conditioner, being suitable for the air conditioner in embodiments of the first aspect, and comprising:

acquiring an outdoor ambient temperature when the air conditioner is turned on in a cooling mode, acquiring a preset current threshold, a preset compressor frequency threshold and a preset current difference threshold corresponding to the outdoor ambient temperature, acquiring, at the time that the compressor is started for a first set time, a working current as a first current, acquiring, at the time that the compressor is started for a second set time, a working current as a second current, and acquiring, at the time that the compressor is started for the second set time, a compressor frequency, detecting and confirming that the following three conditions are met at the same time, and controlling the air conditioner to stop and exchanging control strategies for a first electronic expansion valve and a second electronic expansion valve, wherein the three conditions are:

the second current being greater than the preset current threshold, a difference between the second current and the first current being greater than the preset current difference threshold, and the compressor frequency at the time that the compressor is started for the second set time being less than the preset compressor frequency threshold.

According to the control method for an air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via a first coolant branch of the plate heat exchanger and the throttle valve in sequence, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements. Furthermore, the embodiment enables to control the air conditioner to stop and exchange control strategies for a first electronic expansion valve and a second electronic expansion valve when the following three conditions are met at the same time, so as to ensure that the air conditioner can still operate normally when the first electronic expansion valve and the second electronic expansion valve are plugged in reverse, thereby improving the system reliability, wherein the three conditions are: the second current being greater than the preset current threshold, a difference between the second current and the first current being greater than the preset current difference threshold, and the compressor frequency at the time that the compressor is started for the second set time being less than the preset compressor frequency threshold.

To achieve the above aspects, the third aspect of embodiments of the present disclosure provides a control device for an air conditioner, being suitable for the air conditioner in embodiments of the first aspect, and comprising:

a first acquiring module, configured to acquire an outdoor ambient temperature after the air conditioner is turned on in a cooling mode, a second acquiring module, configured to acquire a preset current threshold, a preset compressor frequency threshold and a preset current difference threshold corresponding to the outdoor ambient temperature, a third acquiring module, configured to acquire, at the time that the compressor is started for a first set time, a working current as a first current, a fourth acquiring module, configured to acquire, at the time that the compressor is started for a second set time, a working current as a second current, and acquire, at the time that the compressor is started for the second set time, a compressor frequency, and a first control module, configured to detect and confirm that the following three conditions are met at the same time, and control the air conditioner to stop and exchange control strategies for a first electronic expansion valve and a second electronic expansion valve, wherein the three conditions are:

the second current being greater than the preset current threshold, a difference between the second current and the first current being greater than the preset current difference threshold, and the compressor frequency at the time that the compressor is started for the second set time being less than the preset compressor frequency threshold.

According to the control device for an air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via a first coolant branch of the plate heat exchanger and the throttle valve in sequence, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements. Furthermore, the embodiment enables to control the air conditioner to stop and exchange control strategies for a first electronic expansion valve and a second electronic expansion valve when the following three conditions are met at the same time, so as to ensure that the air conditioner can still operate normally when the first electronic expansion valve and the second electronic expansion valve are plugged in reverse, thereby improving the system reliability, wherein the three conditions are: the second current being greater than the preset current threshold, a difference between the second current and the first current being greater than the preset current difference threshold, and the compressor frequency at the time that the compressor is started for the second set time being less than the preset compressor frequency threshold.

To achieve the above aspects, the fourth aspect of embodiments of the present disclosure provides a control method for an air conditioner, being suitable for the air conditioner in embodiments of the first aspect, and comprising:

acquiring an outdoor ambient temperature in a cooling mode, detecting and confirming that the outdoor ambient temperature is equal to or less than a preset outdoor ambient temperature threshold, and acquiring a temperature of a middle region of an outdoor condenser, and controlling a rotation speed of an outdoor fan and an opening degree of a throttle valve according to the temperature of the middle region of the outdoor condenser.

According to the control method for an air conditioner proposed in embodiments of the present disclosure, an outdoor ambient temperature is acquired in a cooling mode. When the outdoor ambient temperature is equal to or less than a preset outdoor ambient temperature threshold, a temperature of a middle region of an outdoor condenser is acquired. A rotation speed of an outdoor fan and an opening degree of a throttle valve is controlled according to the temperature of the middle region of the outdoor condenser, thus ensuring the air conditioner to be operated stably and reliably at a low temperature, with a low cost, a high production efficiency, and convenient for after-sales maintenance.

According to an embodiment of the present disclosure, controlling a rotation speed of an outdoor fan and an opening degree of a throttle valve according to the temperature of the middle region of the outdoor condenser comprises:

acquiring a preset saturated coolant temperature corresponding to the outdoor ambient temperature, and detecting and confirming that the temperature of the middle region of the outdoor condenser is greater than the preset saturated coolant temperature, controlling the outdoor fan to operate at a preset maximum rotation speed, and controlling the opening degree of the throttle valve according to a preset target exhaust temperature.

According to an embodiment of the present disclosure, controlling a rotation speed of an outdoor fan and an opening degree of a throttle valve according to the temperature of the middle region of the outdoor condenser further comprises:

detecting and confirming that the temperature of the middle region of the outdoor condenser is equal to or greater than a first temperature threshold and less than or equal to the preset saturated coolant temperature, controlling the outdoor fan to maintain a present rotation speed, and controlling the throttle valve to maintain a present opening degree, wherein a difference between the preset saturated coolant temperature and the first temperature threshold is equal to a first preset difference.

According to an embodiment of the present disclosure, controlling a rotation speed of an outdoor fan and an opening degree of a throttle valve according to the temperature of the middle region of the outdoor condenser further comprises:

detecting and confirming that the temperature of the middle region of the outdoor condenser is greater than a second temperature threshold and less than the first temperature threshold, controlling the rotation speed of the outdoor fan to gradually decrease by a first set value until the outdoor fan stops running, and detecting and confirming that the outdoor fan stops running for a first set time and controlling the opening degree of the throttle valve to gradually increase, and detecting and confirming that the temperature of the middle region of the outdoor condenser is greater than the preset saturated coolant temperature, and controlling the throttle valve to maintain a present opening degree, wherein a difference between the preset saturated coolant temperature and the second temperature threshold is equal to a second preset difference, and the second preset difference is greater than the first preset difference.

According to an embodiment of the present disclosure, controlling a rotation speed of an outdoor fan and an opening degree of a throttle valve according to the temperature of the middle region of the outdoor condenser further comprises:

detecting and confirming that the temperature of the middle region of the outdoor condenser is equal to or lower than the second temperature threshold, and controlling the rotation speed of the outdoor fan to gradually decrease by a second set value until the outdoor fan stops running, detecting and confirming that the outdoor fan stops running for the first set time, and controlling the opening degree of the throttle valve to gradually increase, detecting and confirming that the temperature of the middle region of the outdoor condenser is greater than the preset saturated coolant temperature, and controlling the throttle valve to maintain a present opening degree, wherein the second set value is greater than the first set value.

According to an embodiment of the present disclosure, the control method further comprises:

detecting and confirming that the outdoor ambient temperature is greater than the preset outdoor ambient temperature threshold, controlling the outdoor fan to operate at the preset maximum rotation speed, and controlling the opening degree of the throttle valve according to the preset target exhaust temperature.

According to an embodiment of the present disclosure, acquiring an outdoor ambient temperature comprises acquiring the outdoor ambient temperature periodically.

To achieve the above aspects, the fifth aspect of embodiments of the present disclosure provides a control device for an air conditioner, being suitable for the air conditioner in embodiments of the first aspect, and comprising:

a fifth acquiring module, configured to acquire an outdoor ambient temperature in a cooling mode, a sixth acquiring module, configured to detect and confirm that the outdoor ambient temperature is equal to or less than a preset outdoor ambient temperature threshold, and acquire a temperature of a middle region of an outdoor condenser, and a second control module, configured to control a rotation speed of an outdoor fan and an opening degree of a throttle valve according to the temperature of the middle region of the outdoor condenser.

According to the control device for an air conditioner proposed in embodiments of the present disclosure, an outdoor ambient temperature is acquired in a cooling mode. When the outdoor ambient temperature is equal to or less than a preset outdoor ambient temperature threshold, a temperature of a middle region of an outdoor condenser is acquired. A rotation speed of an outdoor fan and an opening degree of a throttle valve is controlled according to the temperature of the middle region of the outdoor condenser, thus ensuring the air conditioner to be operated stably and reliably at a low temperature, with a low cost, a high production efficiency, and convenient for after-sales maintenance.

To achieve the above aspects, the sixth aspect of embodiments of the present disclosure provides an air conditioner, comprising a control device for an air conditioner in embodiments of the fifth aspect.

To achieve the above aspects, the seventh aspect of embodiments of the present disclosure provides an electronic device, comprising a memory, a processor, and a computer program stored in the memory and executable by the processor, wherein the computer program when executed by the processor performs a control method for an air conditioner in embodiments of the second aspect or a control method for an air conditioner in embodiments of the fourth aspect.

To achieve the above aspects, the fifth aspect of embodiments of the present disclosure provides a computer readable storage medium, having stored therein a computer program that, when executed by a processor, performs a control method for an air conditioner in embodiments of the second aspect or a control method for an air conditioner in embodiments of the fourth aspect.

DETAILED DESCRIPTION OF EMBODIMENTS

Figure 1:
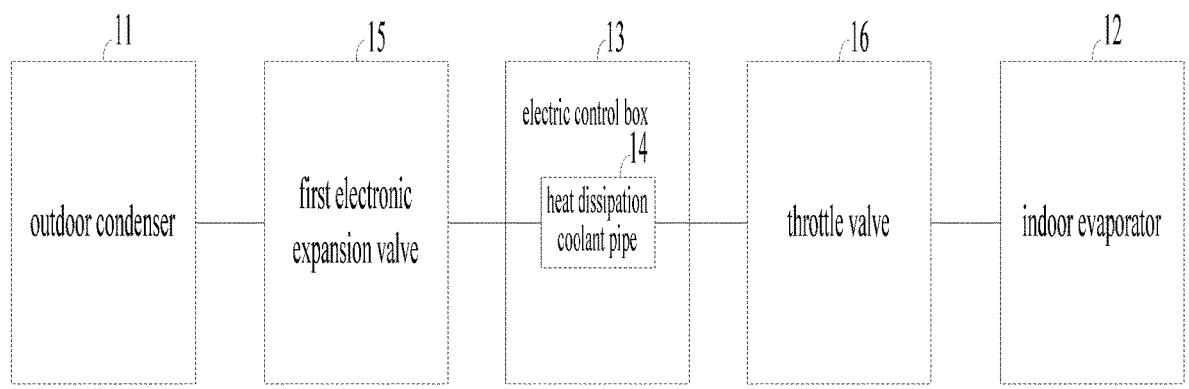
FIG. 1 is a schematic diagram illustrating structure of an air conditioner according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are illustrative, and used to generally understand the present disclosure. The embodiments shall not be construed to limit the present disclosure.

A control method for an air conditioner, a control device for an air conditioner and an air conditioner in embodiments of the present disclosure are described with reference to the drawings.

FIG. 1 is a schematic diagram illustrating structure of an air conditioner according to an embodiment of the present disclosure.

A shown in FIG. 1, the air conditioner includes: an outdoor condenser 11, an indoor evaporator 12, a first electronic expansion valve 15, a throttle valve 16, and a heat dissipation coolant pipe 14 arranged in an electric control box 13.

The outdoor condenser 11 is communicated with a first end of the heat dissipation coolant pipe 14 via the first electronic expansion valve 15.

The indoor evaporator 12 is communicated with a second end of the heat dissipation coolant pipe 14 via the throttle valve 16.

The first electronic expansion valve 15 is configured to throttle a coolant in a heating mode, and the throttle valve 16 is configured to throttle the coolant in a cooling mode.

Among them, the heat dissipation coolant pipe 14 may be a section of a coolant pipe arranged in the electric control box 13.

According to the embodiment of the present disclosure, the outdoor condenser 11 is communicated with a first end of the heat dissipation coolant pipe 14 via the first electronic expansion valve 15, the indoor evaporator 12 is communicated with a second end of the heat dissipation coolant pipe 14 via the throttle valve 16, and the heat dissipation coolant pipe 14 is arranged in an electric control box 13. The heat dissipation coolant pipe 14 is configured to dissipate heat from the electric control box 13, thereby timely removing heat generated by the electric control box 13 under a high temperature, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements.

Among them, the throttle valve 16 may be a one-way throttle valve. In the heating mode, the first electronic expansion valve 15 is configured to throttle a coolant. In the cooling mode, the throttle valve 16 is configured to throttle the coolant in one direction. Therefore, condensation in the electric control box 13 can be avoided, thereby increasing the reliability of the electric control box 13.

According to the air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via the throttle valve, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements.

Figure 2:
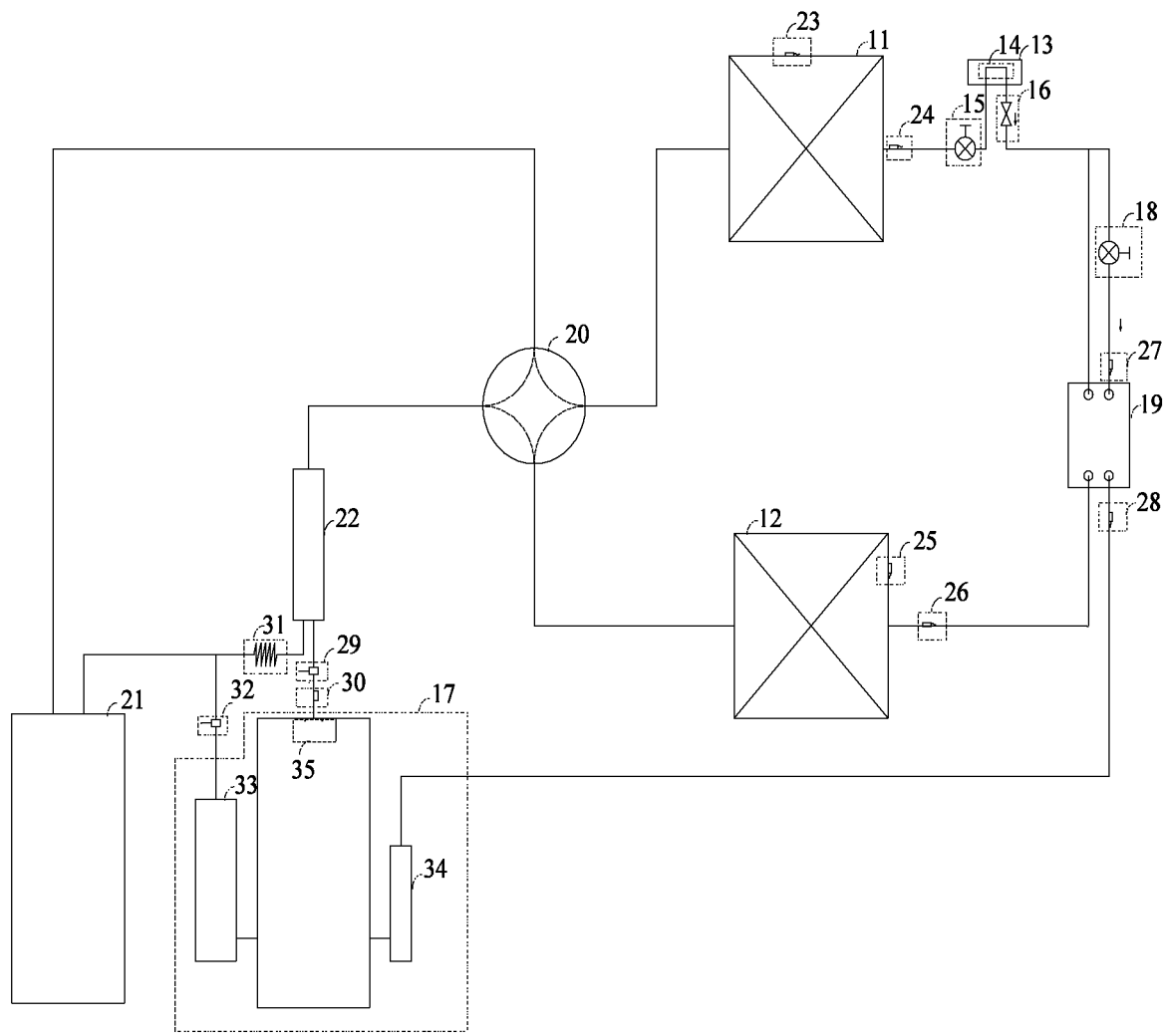
FIG. 2 is a schematic diagram illustrating additional elements of the air conditioner of FIG. 1.

FIG. 2 is a schematic diagram illustrating structure of an air conditioner according to another embodiment of the present disclosure.

As shown in FIG. 2, based on the embodiments shown in FIG. 1, the air conditioner further includes a compressor 17, a second electronic expansion valve 18 and a plate heat exchanger 19.

The indoor evaporator 12 is communicated with the throttle valve 16 via a first coolant branch of the plate heat exchanger 19, the compressor 17 is communicated with the throttle valve 16 via a second coolant branch of the plate heat exchanger 19 and the second electronic expansion valve 18 in sequence, and the second electronic expansion valve 18 is configured to throttle the coolant in a heating mode.

In embodiments of the present disclosure, the compressor 17 may be a compressor with air-injection enthalpy-increasing as shown in FIG. 2. The compressor 17 may include a compressor exhaust port 35, a compressor air return port 33, and a compressor air-injection enthalpy-increasing port 34. An exhaust temperature sensor 30 may be arranged at outside of an exhaust pipe of the compressor 17 and is configured to detect the exhaust temperature of the compressor 17. The air conditioner may also include a high-pressure switch 29 and a low-pressure switch 32. One end of the high-pressure switch 29 is embedded inside the exhaust pipe of the compressor 17, which is configured to detect the exhaust pressure and realize system protection when the pressure is higher than its cut-off value. One end of the low-pressure switch 32 is embedded inside the return air pipe of the compressor 17, which is configured to detect the return air pressure and realize system protection when the pressure is lower than its cut-off value.

The plate heat exchanger 19 is configured to, in the heating mode, realize heat exchange of coolants with different temperatures in the first coolant branch and the second coolant branch passing through the inside of plate heat exchanger 19, so as to make the coolant in the compressor air-injection enthalpy-increasing port 34 to be gaseous, thereby greatly increasing the heating capacity output of the compressor 17 under certain conditions. Among them, an air-injection enthalpy-increasing inlet temperature sensor 27 and an air-injection enthalpy-increasing outlet temperature sensor 28 are respectively arranged at air-injection enthalpy-increasing inlet and air-injection enthalpy-increasing outlet of the air-injection enthalpy-increasing pipeline (the second coolant branch) of the plate heat exchanger 19 and are configured to respectively detect the temperatures at the air-injection enthalpy-increasing inlet and the air-injection enthalpy-increasing outlet. The second electronic expansion valve 18 is configured to throttle the coolant in the heating mode, which can be operated according to the temperature at the air-injection enthalpy-increasing inlet and the temperature at the air-injection enthalpy-increasing outlet.

As shown in FIG. 2, based on the embodiments of FIG. 1, the air conditioner further includes a four-way valve 20 and a liquid storage tank 21.

A first valve port of the four-way valve 20 is communicated with the outdoor condenser 11. A second valve port of the four-way valve 20 is communicated with the indoor evaporator 12. A third valve port of the four-way valve 20 is communicated with the liquid storage tank 21. A fourth valve port of the four-way valve 20 is communicated with the compressor 17. The liquid storage tank 21 is communicated with the compressor 17.

As shown in FIG. 2, based on embodiments of FIG. 1, the air conditioner further includes a separator 22, in which the liquid storage tank 21 and the compressor 17 are respectively communicated with the fourth valve port of the four-way valve 20 via the separator 22.

In certain embodiments of the present disclosure, the air conditioner may further include an oil return capillary 31. The separator 22 is configured to separate cold refining oil discharged from the compressor. The discharged cold refining oil is returned to the compressor 17 by passing through the oil return capillary 31 and the return air pipe of the compressor under the action of the difference of high pressure and low pressure, so as to avoid the compressor 17 from oil shortage.

As shown in FIG. 2, the air conditioner may further include an outdoor ambient temperature sensor 23, a condenser middle-region temperature sensor 24, an indoor ambient temperature sensor 25, and an evaporator middle-region temperature sensor 26. Among them, the condenser middle-region temperature sensor 24 is arranged at a surface of a copper pipe located at a middle region of the outdoor condenser 11 and configured to detect a temperature of the middle region of the outdoor condenser. The outdoor ambient temperature sensor 23 is arranged at a fin on the windward side of the outdoor condenser 11 and configured to detect the outdoor ambient temperature. The indoor ambient temperature sensor 25 is arranged at a fin on the windward side of the indoor evaporator 12 and configured to detect the indoor ambient temperature. The evaporator middle-region temperature sensor 26 is arranged at a surface of a copper pipe located at a middle region of the indoor evaporator 12 and configured to detect a temperature of the middle region of the indoor evaporator 12.

The working principle of the air conditioner in embodiments of the present disclosure is as follows.

(1) When the air conditioner is in a cooling mode, the high-temperature and high-pressure gaseous coolant is discharged from the compressor 17, flows through the separator 22 and the four-way valve 20 and arrives at the outdoor condenser 11 for heat dissipation. The coolant then passes through the first electronic expansion valve 15 (the opening degree is in a maximum level at this time), flows through the heat dissipation coolant pipe 14 inside the electric control box 13, is throttled by the throttle valve 16, and thus forms a low-temperature and low-pressure coolant. The low-temperature and low-pressure coolant flows through the first coolant branch of the plate heat exchanger 19, enters the indoor evaporator 12 and is subjected to vaporization via heat absorption, followed by entering the liquid storage tank 21. The gaseous coolant flows into the compressor 17 for circulation.

(2) When the air conditioner is in a heating mode, the high-temperature and high-pressure gaseous coolant is discharged from the compressor 17, flows through the separator 22 and the four-way valve 20, and arrives at the indoor evaporator 12 and is subjected to heat dissipation. The coolant then flows into the first coolant branch of the plate heat exchanger 19 and flows to the throttle valve 16 (the coolant is not throttled at the time of heating), followed by passing through the heat dissipation coolant pipe 14 inside the electric control box 13, throttled via the first electronic expansion valve 15, thus forming a low-temperature and low-pressure coolant. The coolant flows into the outdoor condenser 11 for vaporization via heat absorption and enters the liquid storage tank 21. The gaseous coolant flows into the compressor 17 for circulation. The plate heat exchanger 19 is configured to, in the heating mode, realize heat exchange of coolants with different temperatures in the first coolant branch and the second coolant branch passing through the inside of plate heat exchanger 19, so as to make the coolant in the compressor air-injection enthalpy-increasing port 34 to be gaseous, thereby greatly increasing the heating capacity output of the compressor 17 under certain conditions.

The air conditioner may further include a controller.

The controller is configured to:

acquire an outdoor ambient temperature T4 after the air conditioner is turned on in the cooling mode, acquire a preset current threshold I0, a preset compressor frequency threshold F0 and a preset current difference threshold A corresponding to the outdoor ambient temperature T4, acquire, at the time when the compressor 17 has started for a first preset time, a working current as a first current I1, acquire, at the time when the compressor 17 has started for a second preset time, a working current as a second current I2, and acquire, at the time when the compressor 17 has started for the second preset time, a compressor frequency F, control the air conditioner to stop and exchange control strategies for the first electronic expansion valve 15 and the second electronic expansion valve 18 when the following three conditions are met at the same time:

the second current I2 being greater than the preset current threshold I0, a difference I2-I1 between the second current I2 and the first current I1 being greater than the preset current difference threshold A, and the compressor frequency F at the time when the compressor 17 has started for the second preset time being less than the preset compressor frequency threshold F0.

In embodiments of the present disclosure, a mapping relationship between the outdoor ambient temperature T4 and the preset current threshold I0, the preset compressor frequency threshold F0 and the preset current difference threshold A can be pre-established in a program. After the air conditioner is turned on in the cooling mode, the outdoor ambient temperature T4 is acquired via the outdoor ambient temperature sensor 23 shown in FIG. 2. The above mapping relationship is queried to acquire the preset current threshold I0, the preset compressor frequency threshold F0 and the preset current difference threshold A corresponding to T4. A working current at the time when the compressor 17 has started for a first preset time is acquired and used as a first current I1. A working current at the time when the compressor 17 has started for a second preset time is acquired and used as a second current I2, and a compressor frequency F at the time when the compressor 17 has started for the second reset time is acquired. When the following three conditions are met at the same time: I2>I0, I2−I1>A and F<F0, it is determined that the first electronic expansion valve 15 and the second electronic expansion valve 18 are plugged in reverse at the time, and thus the built-in preset program controls the air conditioner to stop and exchanges control strategies for the first electronic expansion valve 15 and the second electronic expansion valve 18. The control strategy refers to a control means on the opening degree of the first electronic expansion valve 15 and the second electronic expansion valve 18 in the cooling mode or the heating mode. If for example the control strategy for the first electronic expansion valve 15 is the first opening degree and the control strategy for the second electronic expansion valve 18 is the second opening degree at the time the three conditions are met in the cooling mode, the program exchanges the control strategy for the first electronic expansion valve 15 to the second opening degree and exchanges the control strategy for the second electronic expansion valve 18 to the first opening degree, thereby ensuring the normal operation of the air conditioner and improving system reliability.

According to the air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via the throttle valve, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements. Furthermore, the air conditioner can be controlled to stop and control strategies for a first electronic expansion valve and a second electronic expansion valve can be exchanged when the following three conditions are met at the same time, so as to ensure that the air conditioner can still operate normally when the first electronic expansion valve and the second electronic expansion valve are plugged in reverse, thereby improving the system reliability, in which the three conditions are: the second current being greater than the preset current threshold, a difference between the second current and the first current being greater than the preset current difference threshold, and the compressor frequency at the time when the compressor has started for the second preset time being less than the preset compressor frequency threshold.

Figure 3:
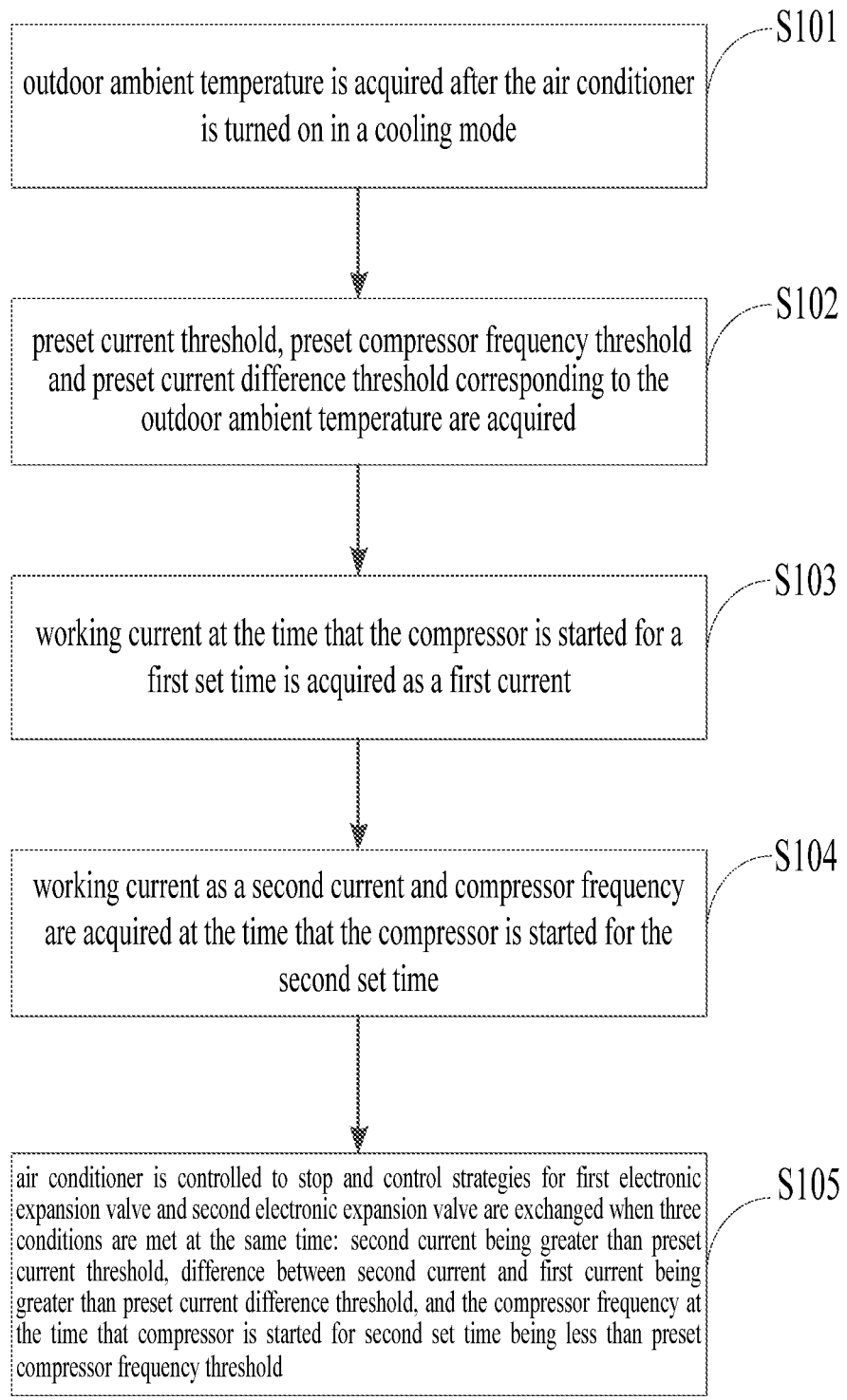
FIG. 3 is a flow chart showing a control method for an air conditioner according to an embodiment of the present disclosure.

FIG. 3 is a flow chart showing a control method for an air conditioner according to an embodiment of the present disclosure.

The control method is suitable for the air conditioner in embodiments of the above aspects.

As shown in FIG. 3, the control method includes the following steps.

S101 an outdoor ambient temperature is acquired after the air conditioner is turned on in a cooling mode.

S102 a preset current threshold, a preset compressor frequency threshold and a preset current difference threshold corresponding to the outdoor ambient temperature are acquired.

S103 a working current at the time when the compressor is started for a first preset time is acquired as a first current.

S104 a working current as a second current and a compressor frequency are acquired at the time when the compressor has started for the second preset time.

S105 the air conditioner is controlled to stop and control strategies for a first electronic expansion valve and a second electronic expansion valve are exchanged when the following three conditions are met at the same time: the second current being greater than the preset current threshold, a difference between the second current and the first current being greater than the preset current difference threshold, and the compressor frequency at the time when the compressor has started for the second preset time being less than the preset compressor frequency threshold.

It should be noted that the foregoing description on embodiments of the air conditioner is also applicable to the control method for the air conditioner in this embodiment, which is not repeated.

According to the control method for an air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via a first coolant branch of the plate heat exchanger and the throttle valve in sequence, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements. Furthermore, the air conditioner can be controlled to stop and control strategies for a first electronic expansion valve and a second electronic expansion valve can be exchanged when the following three conditions are met at the same time, so as to ensure that the air conditioner can still operate normally when the first electronic expansion valve and the second electronic expansion valve are plugged in reverse, thereby improving the system reliability, in which the three conditions are: the second current being greater than the preset current threshold, a difference between the second current and the first current being greater than the preset current difference threshold, and the compressor frequency at the time when the compressor has started for the second preset time being less than the preset compressor frequency threshold.

Figure 4:
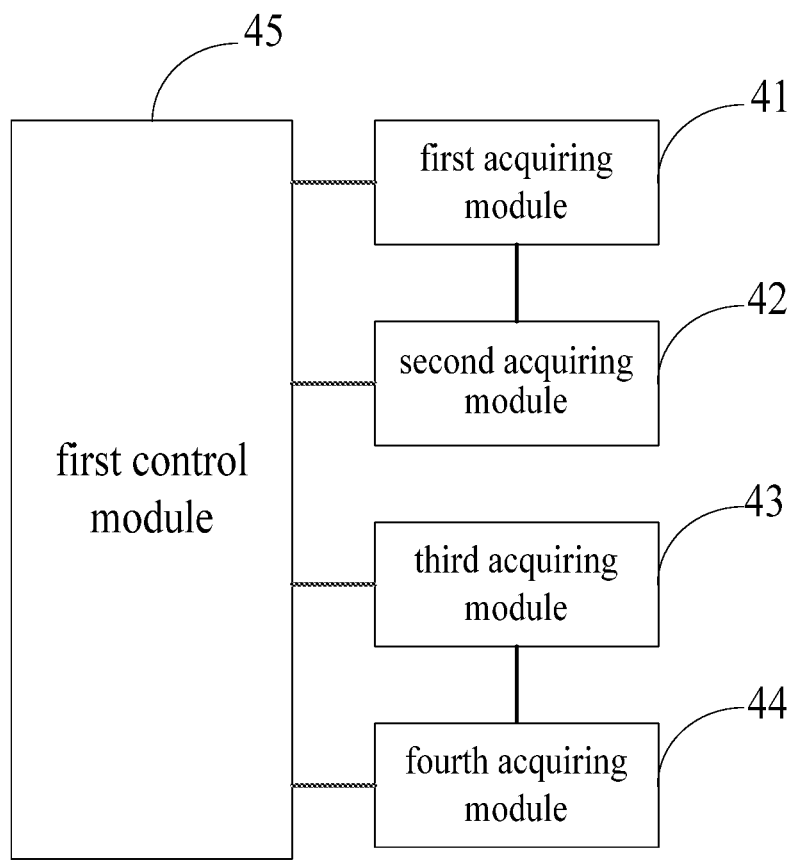
FIG. 4 is a schematic diagram illustrating structure of a control device for an air conditioner according to an embodiment of the present disclosure.

FIG. 4 is a schematic diagram illustrating structure of a control device for an air conditioner according to an embodiment of the present disclosure.

The control device for the air conditioner is suitable for the air conditioner in embodiments of the above aspects.

As shown in FIG. 4, the control device for the air conditioner includes:

a first acquiring module 41, configured to acquire an outdoor ambient temperature after the air conditioner is turned on in a cooling mode, a second acquiring module 42, configured to acquire a preset current threshold, a preset compressor frequency threshold and a preset current difference threshold corresponding to the outdoor ambient temperature, a third acquiring module 43, configured to acquire, at the time when the compressor has started for a first preset time, a working current as a first current, a fourth acquiring module 44, configured to acquire, at the time when the compressor has started for a second preset time, a working current as a second current, and acquire, at the time when the compressor has started for the second preset time, a compressor frequency, and a first control module 45, configured to detect and confirm that the following three conditions are met at the same time, and control the air conditioner to stop and exchange control strategies for a first electronic expansion valve and a second electronic expansion valve, wherein the three conditions are:

the second current being greater than the preset current threshold, a difference between the second current and the first current being greater than the preset current difference threshold, and the compressor frequency at the time when the compressor has started for the second preset time being less than the preset compressor frequency threshold.

It should be noted that the foregoing description on embodiments of the air conditioner is also applicable to the control device for the air conditioner in this embodiment, which is not repeated.

According to the control device for the air conditioner proposed in embodiments of the present disclosure, the outdoor condenser is communicated with a first end of the heat dissipation coolant pipe via the first electronic expansion valve, the indoor evaporator is communicated with a second end of the heat dissipation coolant pipe via a first coolant branch of the plate heat exchanger and the throttle valve in sequence, and the heat dissipation coolant pipe is arranged in an electric control box. The heat dissipation coolant pipe is configured to dissipate heat from the electric control box of the air conditioner, thereby timely removing heat generated by the electric control box, lowering the element temperature, and improving the reliability and service life of the air conditioner. Further, the embodiment enables a variable frequency air conditioner to reach high operating frequencies and output high power under a high temperature, thereby displaying advantages of the variable frequency air conditioner and meeting user requirements. Furthermore, the air conditioner can be controlled to stop and control strategies for a first electronic expansion valve and a second electronic expansion valve can be exchanged when the following three conditions are met at the same time, so as to ensure that the air conditioner can still operate normally when the first electronic expansion valve and the second electronic expansion valve are plugged in reverse, thereby improving the system reliability, in which the three conditions are: the second current being greater than the preset current threshold, a difference between the second current and the first current being greater than the preset current difference threshold, and the compressor frequency at the time when the compressor has started for the second preset time being less than the preset compressor frequency threshold.

It should be noted that the air conditioner may also work at a low temperature (for example, the outdoor ambient temperature is −10° C. or below) during the actual operation. When the air conditioner works at the low temperature, the outdoor heat exchange is sufficient due to the very low outdoor ambient temperature, thereby the coolant after heat exchange in the outdoor side exhibits an excessive degree of supercooling, causing the coolant after throttling has a very low temperature. Thus, it is easy to trigger an indoor preset anti-freezing protection program, resulting in frequent shut-downs, which would not only cause large fluctuations in the indoor temperature, but also generate noise due to frequent startup and shutdown; at the same time, the excessive degree of supercooling results in that the coolant cannot vaporize completely when passing through the indoor side, generating the liquid compression in the compressor, which affects the reliability and service life of the compressor.

At present, the air conditioner is usually additionally equipped with temperature sensors or pressure switches or is disposed to change the heat dissipation area of some condensers to ensure the operation in a low temperature environment. However, these solutions not only lead to an increased cost, but also reduce the production efficiency and increase difficulty of after-sales maintenance. Based on the above, this present disclosure also proposes another control method for an air conditioner, which enables the air conditioner to operate stably and reliably at a low temperature, with a low cost, a high production efficiency and convenient for after-sales maintenance.

Figure 5:
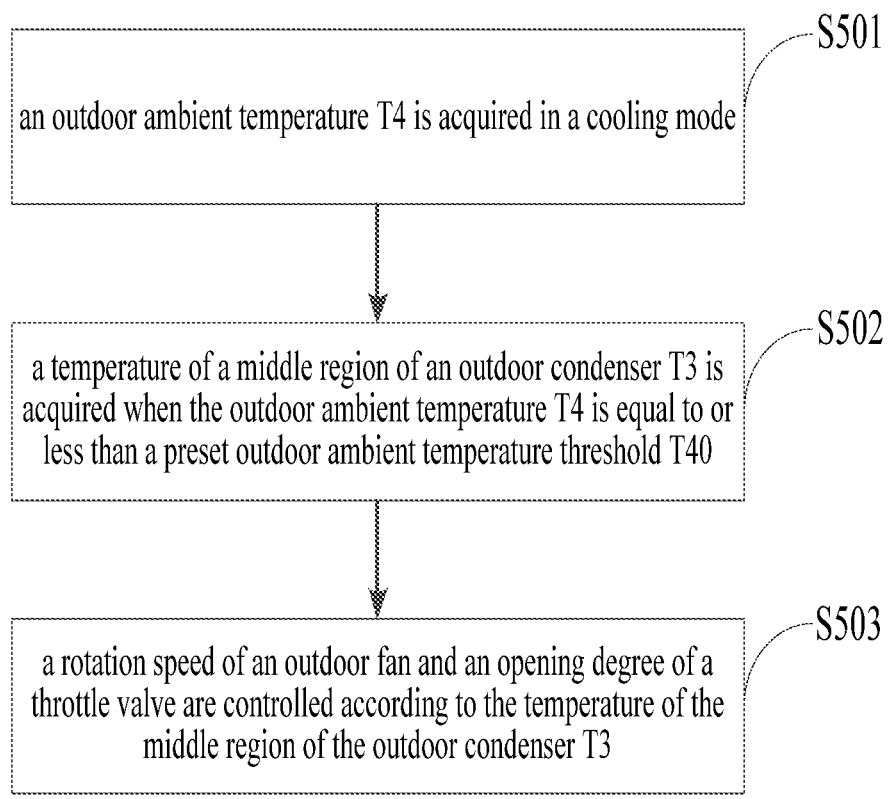
FIG. 5 is a flow chart showing a control method for an air conditioner according to another embodiment of the present disclosure.

As shown in FIG. 5, the control method for the air conditioner according to another embodiment of the present disclosure may include the following steps.

S501 an outdoor ambient temperature T4 is acquired in a cooling mode.

In embodiments of the present disclosure, in the cooling mode, the outdoor ambient temperature T4 can be periodically acquired via the outdoor ambient temperature sensor 23 as shown in FIG. 2, and the acquisition period is T.

S502 a temperature of a middle region of an outdoor condenser T3 is acquired when the outdoor ambient temperature T4 is equal to or less than a preset outdoor ambient temperature threshold T40.

In embodiments of the present disclosure, the outdoor ambient temperature threshold T40 may be preset. The outdoor ambient temperature threshold T40 may be a temperature threshold of the air conditioner in a low-temperature cooling working state, for example, −10° C. After the outdoor ambient temperature T4 is acquired, the outdoor ambient temperature T4 is compared with T40. If T4≤T40, it indicates that the air conditioner is in the low-temperature cooling working state at the time. The temperature of the middle region of the outdoor condenser T3 is acquired. Particularly, the temperature of the middle region of the outdoor condenser T3 may be acquired via the condenser middle-region temperature sensor 24 as shown in FIG. 2.

S503 a rotation speed of an outdoor fan and an opening degree of a throttle valve are controlled according to the temperature of the middle region of the outdoor condenser T3.

In embodiments of the present disclosure, the rotation speed of the outdoor fan and the opening degree of the throttle valve are controlled according to the temperature of the middle region of the outdoor condenser T3, and after the time period T, the step S501 is returned to and the subsequent steps are executed. Controlling the rotation speed of the outdoor fan according to the temperature of the middle region of the outdoor condenser can achieve the effect of energy saving and electricity saving.

According to the control method for an air conditioner proposed in embodiments of the present disclosure, an outdoor ambient temperature is acquired in a cooling mode. When the outdoor ambient temperature is equal to or less than a preset outdoor ambient temperature threshold, a temperature of a middle region of an outdoor condenser is acquired. A rotation speed of an outdoor fan and an opening degree of a throttle valve is controlled according to the temperature of the middle region of the outdoor condenser, thus ensuring the air conditioner to be operated stably and reliably at a low temperature, with a low cost, a high production efficiency, and convenient for after-sales maintenance.

Figure 6:
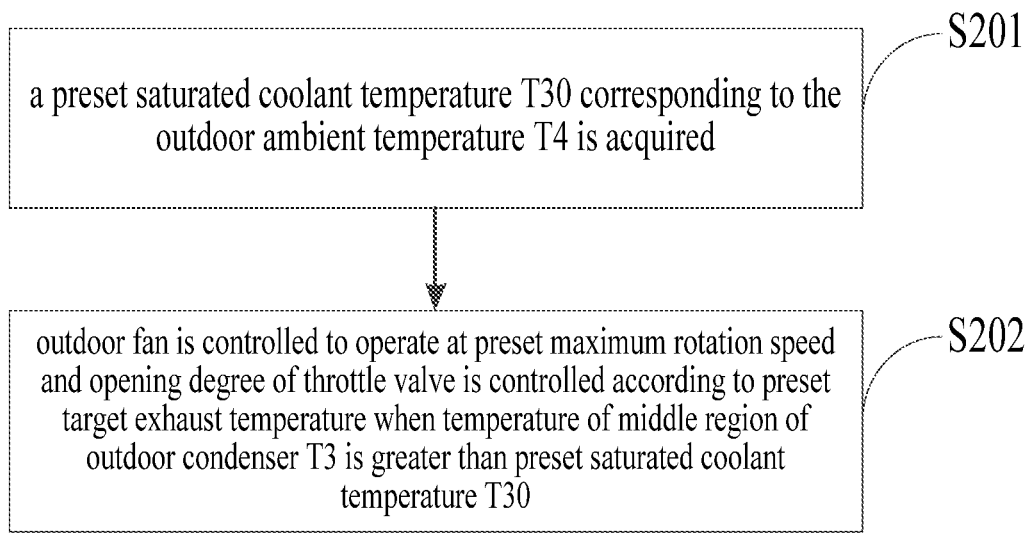
FIG. 6 is a flow chart showing a control method for an air conditioner according to another embodiment of the present disclosure.

As shown in FIG. 6, FIG. 6 is a flow chart showing a control method for an air conditioner according to another embodiment of the present disclosure.

The S503 in embodiments shown in FIG. 5 may include the following steps.

S601 a preset saturated coolant temperature T30 corresponding to the outdoor ambient temperature T4 is acquired.

In embodiments of this present disclosure, a mapping relationship between the outdoor ambient temperature T4 and the preset saturated coolant temperature T30 may be preset in the program. After the outdoor ambient temperature T4 is acquired, the above mapping relationship is queried to acquire the corresponding preset saturated coolant temperature T30.

S602 the outdoor fan is controlled to operate at a preset maximum rotation speed and the opening degree of the throttle valve is controlled according to a preset target exhaust temperature when the temperature of the middle region of the outdoor condenser T3 is greater than the preset saturated coolant temperature T30.

In embodiments of this present disclosure, if T3>T30, the outdoor fan is controlled to operate at a preset maximum rotation speed and the opening degree of the throttle valve is controlled according to a preset target exhaust temperature.

The S503 in embodiments shown in FIG. 5 may further include:

controlling the outdoor fan to maintain a present rotation speed and controlling the throttle valve to maintain a present opening degree, when the temperature of the middle region of the outdoor condenser T3 is equal to or greater than a first temperature threshold T30-ΔT1 and less than or equal to the preset saturated coolant temperature T30, in which a difference between the preset saturated coolant temperature T30 and the first temperature threshold T30-ΔT1 is equal to a first preset difference ΔT1.

In embodiments of this present disclosure, a first preset difference ΔT1 may be preset, and the first temperature threshold is T30−ΔT1. If T30−ΔT1≤T3≤T30, the outdoor fan is controlled to maintain a present rotation speed and the throttle valve is controlled to maintain a present opening degree.

The S503 in embodiments shown in FIG. 5 may further include:

controlling the rotation speed of the outdoor fan to gradually decrease by a first set value until the outdoor fan stops running, and controlling the opening degree of the throttle valve to gradually increase after the outdoor fan stops running for a first set time when the temperature of the middle region of the outdoor condenser T3 is greater than a second temperature threshold T30−ΔT2 and less than the first temperature threshold T30−ΔT1, and controlling the throttle valve to maintain a present opening degree when the temperature of the middle region of the outdoor condenser T3 is greater than the preset saturated coolant temperature T30, in which a difference between the preset saturated coolant temperature T30 and the second temperature threshold T30−ΔT2 is equal to a second preset difference ΔT2, and the second preset difference ΔT2 is greater than the first preset difference ΔT1.

In embodiments of this present disclosure, a second preset difference ΔT2 may be preset, and the second temperature threshold is T30−ΔT2, in which ΔT2>ΔT1. If T30−ΔT2<T3<T30−ΔT1, the rotation speed of the outdoor fan is controlled to gradually decrease by a first set value until the outdoor fan stops running. For example, when the first set value is N speed/minute, the rotation speed of the outdoor fan is controlled to gradually decrease by the N speed/minute until the outdoor fan stops running. Further, after the outdoor fan stops running for a first set time, the opening degree of the electronic expansion valve is controlled to gradually increase. When T3>T30, the electronic expansion valve is controlled to maintain a present opening degree.

The S503 in embodiments shown in FIG. 5 may further include:

controlling the rotation speed of the outdoor fan to gradually decrease by a second set value until the outdoor fan stops running when the temperature of the middle region of the outdoor condenser T3 is equal to or lower than the second temperature threshold T30−ΔT2, controlling the opening degree of the throttle valve to gradually increase after the outdoor fan stops running for the first set time, and controlling the throttle valve to maintain a present opening degree when the temperature of the middle region of the outdoor condenser T3 is greater than the preset saturated coolant temperature T30, in which the second set value is greater than the first set value.

In embodiments of this present disclosure, if T3≤T30−ΔT2, the rotation speed of the outdoor fan is controlled to gradually decrease by a second set value until the outdoor fan stops running. For example, when the second set value is M speed/minute, the rotation speed of the outdoor fan is controlled to gradually decrease by the M speed/minute until the outdoor fan stops running, in which the second set value is greater than the first set value. After the outdoor fan stops running for the first set time, the opening degree of the throttle valve is controlled to gradually increase. When T3>T30, the throttle valve is controlled to maintain a present opening degree.

Based on the embodiments shown in FIG. 5, the control method further includes:

controlling the outdoor fan to operate at the preset maximum rotation speed and controlling the opening degree of the throttle valve according to the preset target exhaust temperature when the outdoor ambient temperature T4 is greater than the preset outdoor ambient temperature threshold T40.

In embodiments of the present disclosure, if T4>T40, it indicates that the air conditioner is not in a low-temperature cooling working state, and thus the outdoor fan is controlled to operate at the preset maximum rotation speed and the opening degree of the throttle valve is controlled according to the preset target exhaust temperature. After the time period T, the step S501 is returned to and the subsequent steps are executed.

Figure 7:
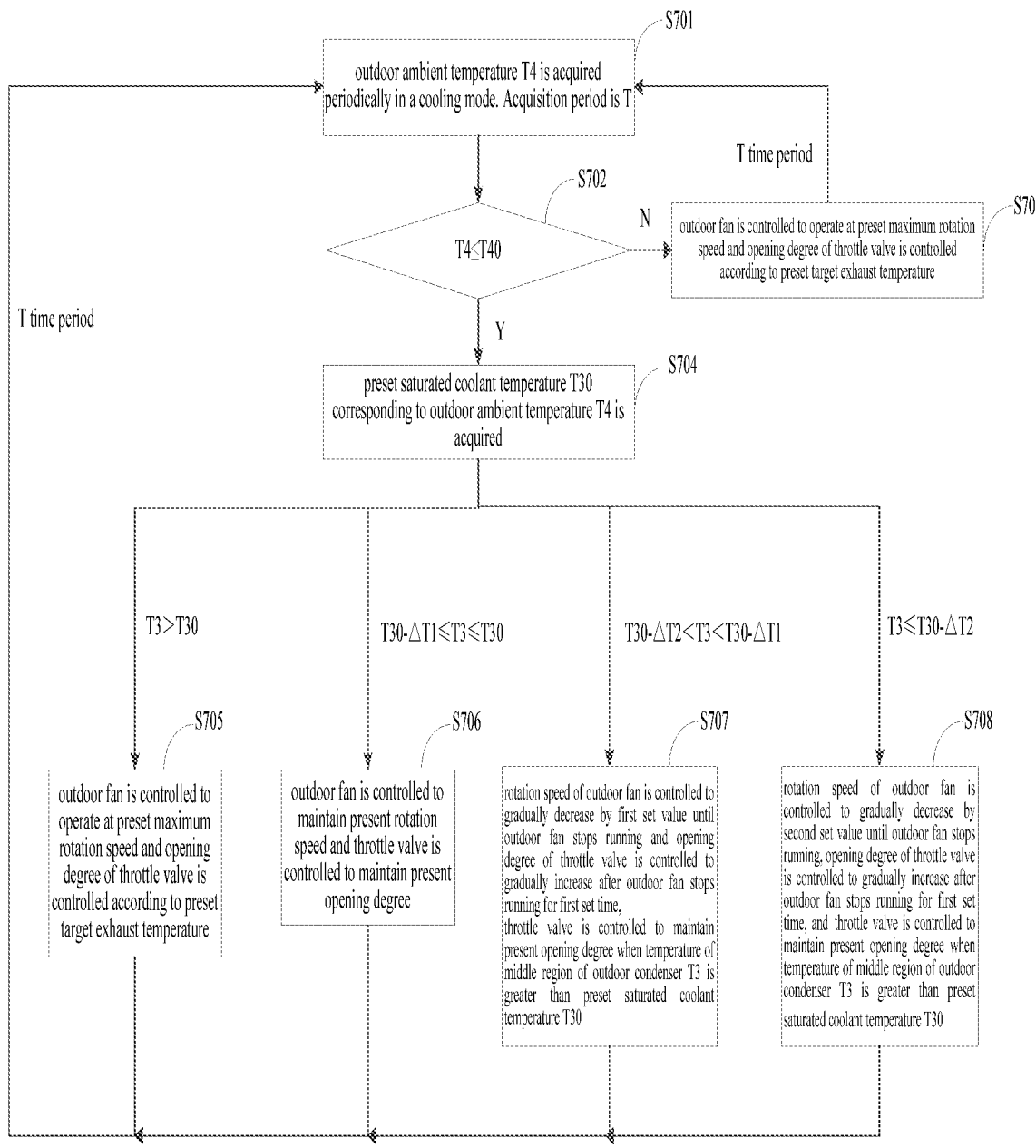
FIG. 7 is a flow chart showing a control method for an air conditioner according to a particular embodiment of the present disclosure.

The control method for the air conditioner in embodiments of the present disclosure is described in detail in combination with FIG. 7.

FIG. 7 is a flow chart showing a control method for an air conditioner according to a particular embodiment of the present disclosure.

As shown in FIG. 7, the control method includes the following steps.

S701 an outdoor ambient temperature T4 is acquired periodically in a cooling mode and the acquisition period is T.

S702 Detecting if T4≤T40

If yes, a step S704 is executed. If no, a step S703 is executed.

S703 the outdoor fan is controlled to operate at the preset maximum rotation speed and the opening degree of the throttle valve is controlled according to the preset target exhaust temperature, and the step S701 is returned to after the time period T.

S704 a preset saturated coolant temperature T30 corresponding to the outdoor ambient temperature T4 is acquired.

If T3>T30, a step S705 is executed.
If T30−ΔT1≤T3≤T30, a step S706 is executed.
If T30−ΔT2<T3<T30−ΔT1, a step S707 is executed.
If T3≤T30−ΔT2, a step S708 is executed.

S705 the outdoor fan is controlled to operate at a preset maximum rotation speed and the opening degree of the throttle valve is controlled according to a preset target exhaust temperature. The step S301 is returned to after the time period T.

S706 the outdoor fan is controlled to maintain a present rotation speed and the throttle valve is controlled to maintain a present opening degree. The step S701 is returned to after the time period T.

S707 the rotation speed of the outdoor fan is controlled to gradually decrease by a first set value until the outdoor fan stops running and the opening degree of the throttle valve is controlled to gradually increase after the outdoor fan stops running for a first set time, the throttle valve is controlled to maintain a present opening degree when the temperature of the middle region of the outdoor condenser T3 is greater than the preset saturated coolant temperature T30. The step S701 is returned to after the time period T.

S708 the rotation speed of the outdoor fan is controlled to gradually decrease by a second set value until the outdoor fan stops running, the opening degree of the throttle valve is controlled to gradually increase after the outdoor fan stops running for the first set time, and the throttle valve is controlled to maintain a present opening degree when the temperature of the middle region of the outdoor condenser T3 is greater than the preset saturated coolant temperature T30. The step S701 is returned to after the time period T.

According to the control method for an air conditioner proposed in embodiments of the present disclosure, an outdoor ambient temperature is acquired in a cooling mode. When the outdoor ambient temperature is equal to or less than a preset outdoor ambient temperature threshold, a temperature of a middle region of an outdoor condenser is acquired. A rotation speed of an outdoor fan and an opening degree of a throttle valve is controlled according to the temperature of the middle region of the outdoor condenser, thus ensuring the air conditioner to be operated stably and reliably at a low temperature, with a low cost, a high production efficiency, and convenient for after-sales maintenance.

Figure 8:
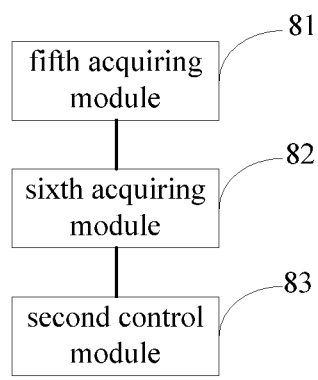
FIG. 8 is a schematic diagram illustrating structure of a control device for an air conditioner according to another embodiment of the present disclosure.

FIG. 8 is a schematic diagram illustrating structure of a control device for an air conditioner according to an embodiment of the present disclosure.

As shown in FIG. 8, the control device includes:

a fifth acquiring module 81, configured to acquire an outdoor ambient temperature in a cooling mode, a sixth acquiring module 82, configured to detect and confirm that the outdoor ambient temperature is equal to or less than a preset outdoor ambient temperature threshold, and acquire a temperature of a middle region of an outdoor condenser, and a second control module 83, configured to control a rotation speed of an outdoor fan and an opening degree of a throttle valve according to the temperature of the middle region of the outdoor condenser.

It should be noted that the foregoing description on embodiments of the control method for the air conditioner is also applicable to the control device for the air conditioner in this embodiment, which is not repeated.

According to the control device for an air conditioner proposed in embodiments of the present disclosure, an outdoor ambient temperature is acquired in a cooling mode. When the outdoor ambient temperature is equal to or less than a preset outdoor ambient temperature threshold, a temperature of a middle region of an outdoor condenser is acquired. A rotation speed of an outdoor fan and an opening degree of a throttle valve is controlled according to the temperature of the middle region of the outdoor condenser, thus ensuring the air conditioner to be operated stably and reliably at a low temperature, with a low cost, a high production efficiency, and convenient for after-sales maintenance.

In a possible implementation manner of embodiments of the present disclosure, the second control module 83 is configured to:

acquire a preset saturated coolant temperature corresponding to the outdoor ambient temperature, and control the outdoor fan to operate at a preset maximum rotation speed and control the opening degree of the throttle valve according to a preset target exhaust temperature when the temperature of the middle region of the outdoor condenser is greater than the preset saturated coolant temperature.

In a possible implementation manner of embodiments of the present disclosure, the second control module 83 is configured to:

control the outdoor fan to maintain a present rotation speed and control the throttle valve to maintain a present opening degree when the temperature of the middle region of the outdoor condenser is equal to or greater than a first temperature threshold and less than or equal to the preset saturated coolant temperature, in which a difference between the preset saturated coolant temperature and the first temperature threshold is equal to a first preset difference.

In a possible implementation manner of embodiments of the present disclosure, the second control module 83 is configured to:

control the rotation speed of the outdoor fan to gradually decrease by a first set value until the outdoor fan stops running and control the opening degree of the throttle valve to gradually increase after the outdoor fan stops running for a first set time when the temperature of the middle region of the outdoor condenser is greater than a second temperature threshold and less than the first temperature threshold, and control the throttle valve to maintain a present opening degree when the temperature of the middle region of the outdoor condenser is greater than the preset saturated coolant temperature, in which a difference between the preset saturated coolant temperature and the second temperature threshold is equal to a second preset difference, and the second preset difference is greater than the first preset difference.

In a possible implementation manner of embodiments of the present disclosure, the second control module 83 is configured to:

control the rotation speed of the outdoor fan to gradually decrease by a second set value until the outdoor fan stops running when the temperature of the middle region of the outdoor condenser is equal to or lower than the second temperature threshold, control the opening degree of the throttle valve to gradually increase after the outdoor fan stops running for the first set time, and control the throttle valve to maintain a present opening degree when the temperature of the middle region of the outdoor condenser is greater than the preset saturated coolant temperature, in which the second set value is greater than the first set value.

In a possible implementation manner of embodiments of the present disclosure, the second control module 83 is further configured to:

control the outdoor fan to operate at the preset maximum rotation speed and control the opening degree of the throttle valve according to the preset target exhaust temperature when the outdoor ambient temperature is greater than the preset outdoor ambient temperature threshold.

In a possible implementation manner of embodiments of the present disclosure, the fifth acquiring module 81 is further configured to acquire the outdoor ambient temperature periodically.

It should be noted that the foregoing description on embodiments of the control method for the air conditioner is also applicable to the control device for the air conditioner in this embodiment, which is not repeated.

According to the control device for an air conditioner proposed in embodiments of the present disclosure, an outdoor ambient temperature is acquired in a cooling mode. When the outdoor ambient temperature is equal to or less than a preset outdoor ambient temperature threshold, a temperature of a middle region of an outdoor condenser is acquired. A rotation speed of an outdoor fan and an opening degree of an electronic expansion valve is controlled according to the temperature of the middle region of the outdoor condenser, thus ensuring the air conditioner to be operated stably and reliably at a low temperature, with a low cost, a high production efficiency, and convenient for after-sales maintenance.

Figure 9:
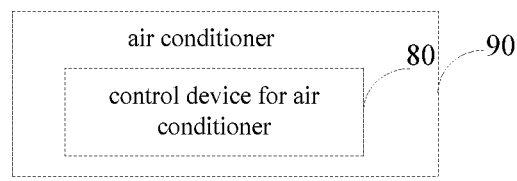
FIG. 9 is a schematic diagram illustrating structure of an air conditioner according to another embodiment of the present disclosure.

To implement the foregoing embodiments, the present disclosure in embodiments further proposes an air conditioner 90. As shown in FIG. 9, the air conditioner 90 includes a control device for an air conditioner 80 in the foregoing embodiments.

Figure 10:
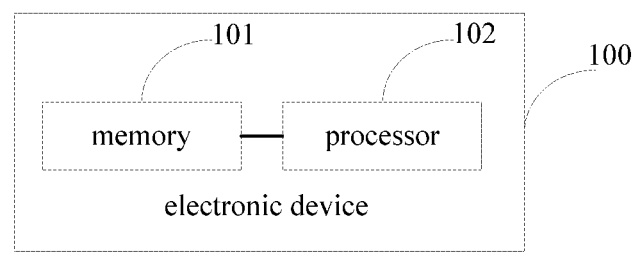
FIG. 10 is a schematic diagram illustrating structure of an electronic device according to an embodiment of the present disclosure.

To implement the foregoing embodiments, the present disclosure in embodiments further proposes an electronic device 100. As shown in FIG. 10, the electronic device 100 includes a memory 101 and a processor 102. A computer program is stored in the memory 101 and is executable by the processor 102. The computer program when executed by the processor 102 performs a control method for an air conditioner in the foregoing embodiments.

To implement the foregoing embodiments, the present disclosure in embodiments further proposes a non-transitory computer readable storage medium, having stored therein a computer program that, when executed by a processor, performs a control method for an air conditioner in the foregoing embodiments.

Reference throughout this specification to terms "an embodiment", "some embodiments", "one embodiment", "another example", "an example", "an illustrative example", "some examples" or the like means that a particular feature, structure, material or characteristic described in connection with the embodiment or example is included in at least one embodiment or example of the present disclosure. Thus, the illustrative representations of the terms are not necessarily directed to the same embodiment or example in this specification. Moreover, the specific features, structures, materials or characteristics as described can be combined in any one or more embodiments or examples in a suitable manner. In addition, those skilled persons in the art can combine different embodiments or examples or the features of the different embodiments or examples described in this specification without contradicting each other.

Although embodiments of the present disclosure have been shown and described, it would be appreciated by those skilled persons in the art that the above embodiments are illustrative and should not be construed to limit the present disclosure. Changes, alternatives, substitutions and modifications can be made in the embodiments by a person of ordinary skill in the art in the scope of the present disclosure.

What is claimed is:

1. An air conditioner comprising:
   an outdoor condenser,
   an indoor evaporator,
   a first electronic expansion valve,
   a throttle valve,
   a heat dissipation coolant pipe arranged in an electric control box,
   a compressor,
   a second electronic expansion valve, and
   a plate heat exchanger,
   wherein:
      the outdoor condenser is communicated with a first end of the heat dissipation coolant pipe via the first electronic expansion valve,
      the indoor evaporator is communicated with a second end of the heat dissipation coolant pipe via the throttle valve, and
      the first electronic expansion valve is configured to throttle a coolant in a heating mode, the throttle valve is configured to throttle the coolant in one direction in a cooling mode, and
   wherein:
      the indoor evaporator is directly connected in series to the throttle valve via a first coolant branch of the plate heat exchanger,
      the compressor is directly connected in series to the second electronic expansion valve and the throttle valve, in sequence, via a second coolant branch of the plate heat exchanger, different from the first coolant branch, and
      the second electronic expansion valve is configured to throttle the coolant in the heating mode.

2. The air conditioner according to claim 1, further comprising a controller,
   wherein the controller is configured to:
      acquire an outdoor ambient temperature when the air conditioner is turned on in the cooling mode,
      acquire a preset current threshold, a preset compressor frequency threshold and a preset current difference threshold corresponding to the outdoor ambient temperature,
      acquire, at the time when the compressor has started for a first preset time, a working current as a first current,
      acquire, at the time when the compressor has started for a second preset time, a working current as a second current, and acquire, at the time when the compressor has started for the second preset time, a compressor frequency, and
      detect and confirm that the following three conditions are met at the same time, and control the air conditioner to stop and exchange control strategies for the first electronic expansion valve and the second electronic expansion valve, wherein the three conditions comprise:
         the second current being greater than the preset current threshold,
         a difference between the second current and the first current being greater than the preset current difference threshold, and
         the compressor frequency at the time when the compressor has started for the second preset time being less than the preset compressor frequency threshold.

3. The air conditioner according to claim 2,
   wherein the stop and exchange control strategies for the first electronic expansion valve and the second electronic expansion valve comprises:
      when the first electronic expansion valve has a first opening degree and the second electronic expansion valve has a second opening degree in the cooling mode of the air conditioner, the first electronic expansion valve is controlled to have the second opening degree and the second electronic expansion valve is controlled to have the first opening degree.

4. The air conditioner according to claim 1, further comprising a four-way valve and a liquid storage tank,
   wherein:
      a first valve port of the four-way valve is communicated with the outdoor condenser,
      a second valve port of the four-way valve is communicated with the indoor evaporator,
      a third valve port of the four-way valve is communicated with the liquid storage tank,
      a fourth valve port of the four-way valve is communicated with the compressor, and
      the liquid storage tank is communicated with the compressor.

5. The air conditioner according to claim 4, further comprising a separator,
   wherein the liquid storage tank and the compressor are respectively communicated with the fourth valve port of the four-way valve via the separator.

6. The air conditioner according to claim 1, further comprising a controller,
   wherein the controller further comprises:
      a first acquiring module, configured to acquire an outdoor ambient temperature after the air conditioner is turned on in a cooling mode, a second acquiring module, configured to acquire a preset current threshold, a preset compressor frequency threshold and a preset current difference threshold corresponding to the outdoor ambient temperature, a third acquiring module, configured to acquire, at the time when the compressor has started for a first preset time, a working current as a first current, a fourth acquiring module, configured to acquire, at the time when the compressor has started for a second preset time, a working current as a second current, and acquire, at the time when the compressor has started for the second preset time, a compressor frequency, and a first control module, configured to detect and confirm that the following three conditions are met at the same time, and control the air conditioner to stop and exchange control strategies for a first electronic expansion valve and a second electronic expansion valve, wherein the three conditions are:
- the second current being greater than the preset current threshold,
- a difference between the second current and the first current being greater than the preset current difference threshold, and
- the compressor frequency at the time when the compressor has started for the second preset time being less than the preset compressor frequency threshold.

* * * * *